United States Patent [19]
Ono et al.

[11] Patent Number: 5,526,367
[45] Date of Patent: Jun. 11, 1996

[54] DATA COMMUNICATION APPARATUS

[75] Inventors: Takashi Ono, Yokosuka; Yasuhide Ueno, Fuchu, both of Japan

[73] Assignee: Canon Kabushiki Kaisha, Tokyo, Japan

[21] Appl. No.: 670,934

[22] Filed: Mar. 18, 1991

[30] Foreign Application Priority Data

Mar. 23, 1990 [JP] Japan ........................... 2-74655

[51] Int. Cl.$^6$ ................................. G08C 25/02
[52] U.S. Cl. ................................. 371/32; 371/30
[58] Field of Search ............... 371/32, 10.1, 10.2, 371/8.1, 40.1, 30, 29.1, 20.1, 68.2; 395/575, 650

[56] References Cited

U.S. PATENT DOCUMENTS

| | | | |
|---|---|---|---|
| 4,661,857 | 4/1987 | Kondo | 358/257 |
| 4,719,514 | 1/1988 | Kurahayashi et al. | 358/261 |
| 4,829,524 | 5/1989 | Yoshida | 371/32 |
| 4,841,550 | 6/1989 | George et al. | 375/118 |
| 4,885,755 | 12/1989 | Yoshida et al. | 375/58 |
| 5,031,179 | 7/1991 | Yoshida et al. | 371/32 |
| 5,075,783 | 12/1991 | Yoshida et al. | 358/439 |
| 5,151,990 | 9/1992 | Allen et al. | 395/650 |

FOREIGN PATENT DOCUMENTS

| | | |
|---|---|---|
| 0201772 | 11/1986 | European Pat. Off. . |
| 2635627 | 2/1990 | France . |
| 3329045 | 2/1984 | Germany . |
| 3606661 | 9/1986 | Germany . |
| 59-101957 | 6/1984 | Japan . |
| 1176162 | 7/1989 | Japan . |
| 2222740 | 3/1990 | United Kingdom . |

OTHER PUBLICATIONS

"Computer Networks" by Andrew S. Tanenbaum, 1988 pp. 309–312 and 237–246.

*Primary Examiner*—Robert W. Beausoliel, Jr.
*Assistant Examiner*—Phung M. Chung
*Attorney, Agent, or Firm*—Fitzpatrick Cella Harper & Scinto

[57] ABSTRACT

A data communication apparatus having an error correcting communication mode in half-duplex operation for communicating data and including a memory for storing received data. The memory has a capacity for storing data of not more than an amount of data to be transmitted in the error correcting communication mode. An overflow in the memory and presence of an error in the received data are detected, and data is requested to be re-sent in accordance with the detection result.

37 Claims, 9 Drawing Sheets

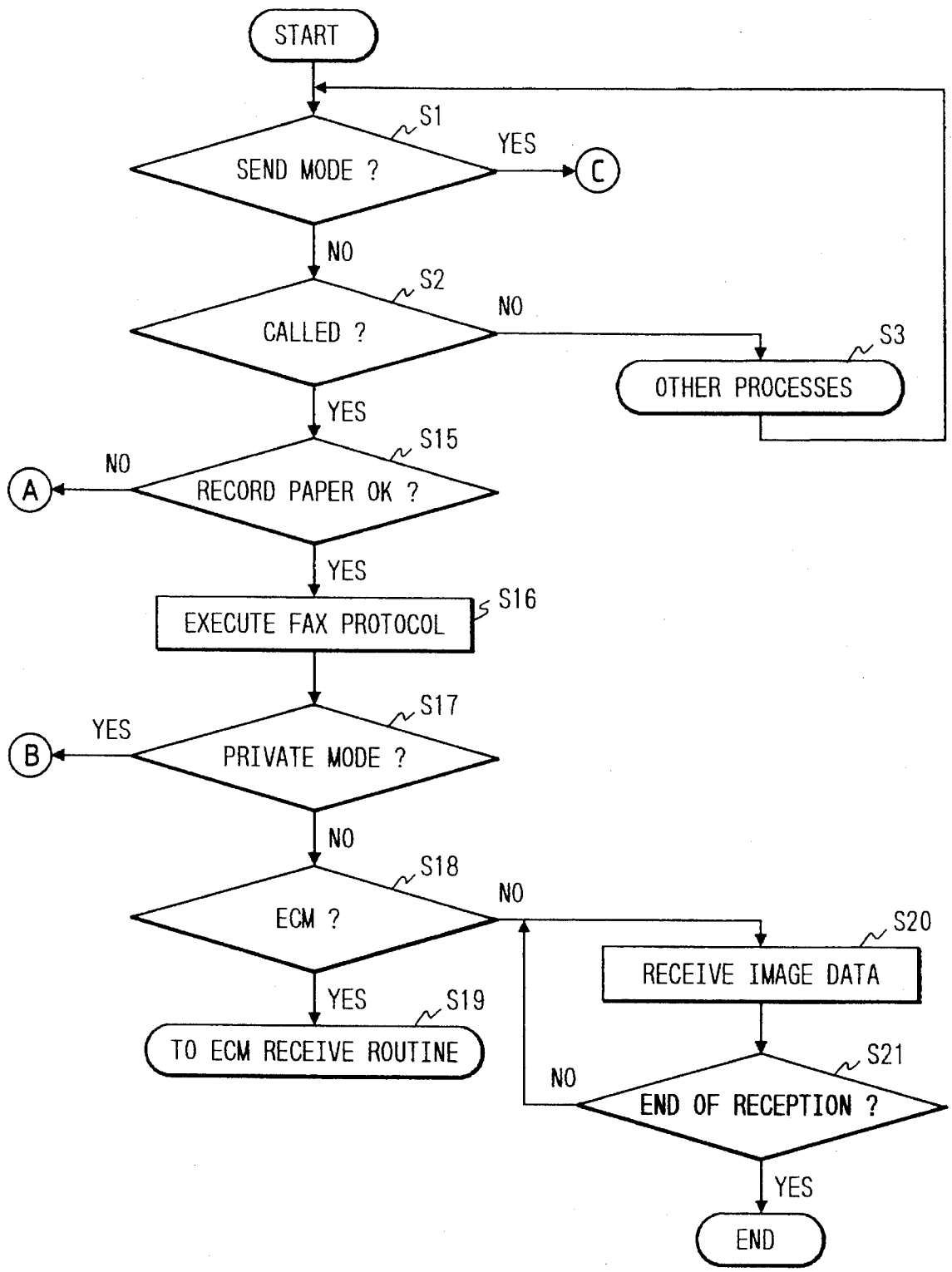

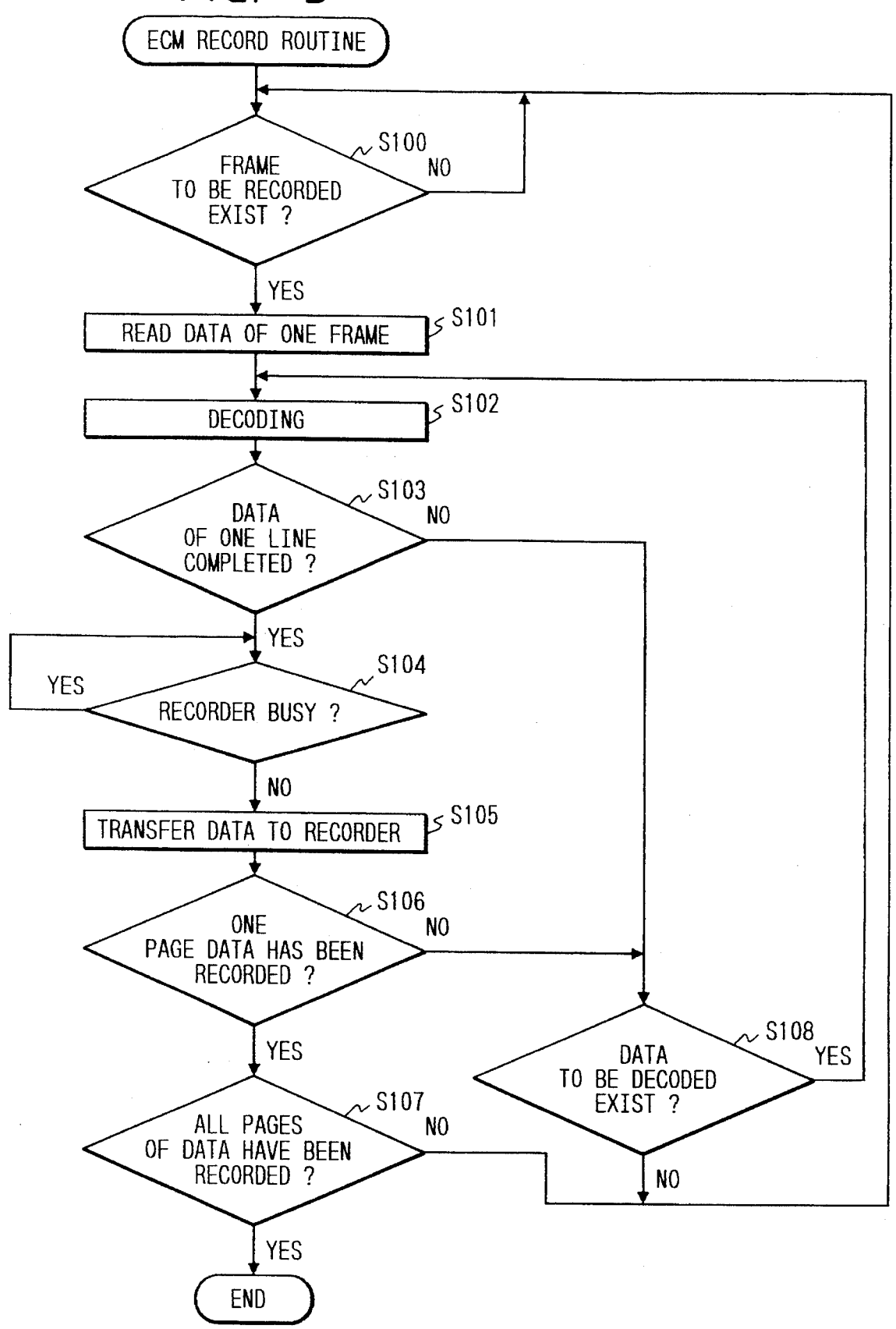

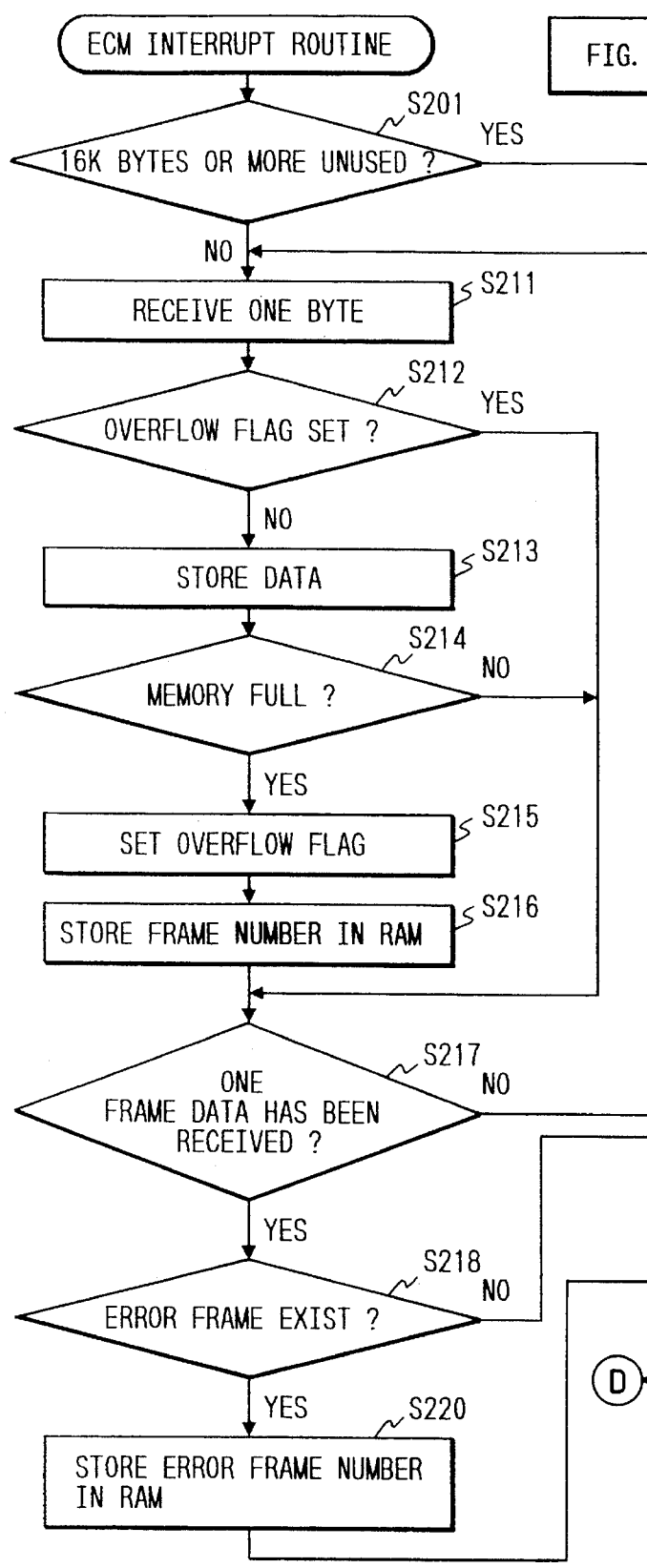

DATA COMMUNICATION APPARATUS

BACKGROUND OF THE INVENTION

1. Field of the Invention

The present invention relates to a data communication apparatus having an error correcting communication function.

2. Related Background Art

As an error correcting mode, an error correcting communication in the full-duplex operation and an error correcting communication in the half-duplex operation have been conventionally known. Especially, as to the error correcting communication in the half-duplex operation, in order to hold data sufficient to sequentially execute a communication sequence of data (picture signal) and an error correcting sequence, it is necessary to have a memory for more than a fixed memory capacity. An error correction mode (ECM) specified in CCITT, for example, should have a memory with a memory capacity of 64K bytes.

The above error correcting communication, especially the error correcting communication in the half-duplex operation should have a memory for more than a fixed memory capacity. To communicate in ECM, for example, a memory capacity of 64K bytes or more should be secured.

In a general data communication apparatus having a memory for storing data, memory sending or memory reception for data is normally performed. If a memory for 64K bytes is left unused for ECM, for example, at this time, the memory as a whole cannot be utilized.

If, however, the capacity of the unused memory is less than 64K bytes, a problem will be caused in which any communication in ECM cannot be made.

Concerning re-sending due to an error, U.S. Pat. Nos. 4,829,524 and 4,885,755 have been used, and also concerning ECM, U.S. Pat. Nos. 5,031,179 and 5,075,783 have been used.

However, the above problem at issue has not yet been solved.

SUMMARY OF THE INVENTION

Thus, it is an object of the present invention to improve a data communication apparatus.

It is a further object of the present invention to make the error correcting communication executable in a small capacity of memory.

It is also an object of the present invention to efficiently utilize a memory for storing data, and to make the error correcting communication executable even if the unused memory has become less than a memory capacity required for a normal error correcting communication.

It is another object of the present invention to execute the error correcting communication in a small capacity of memory by detecting any overflow in memory and presence of an error and treating a request of re-sending in accordance with the detection of an overflow in memory and an error when making the error correcting communication in the half-duplex operation.

The other objects of the present invention will be clarified by the detailed description of the following embodiments and drawings.

DESCRIPTION OF THE PREFERRED EMBODIMENTS

Figure 1:
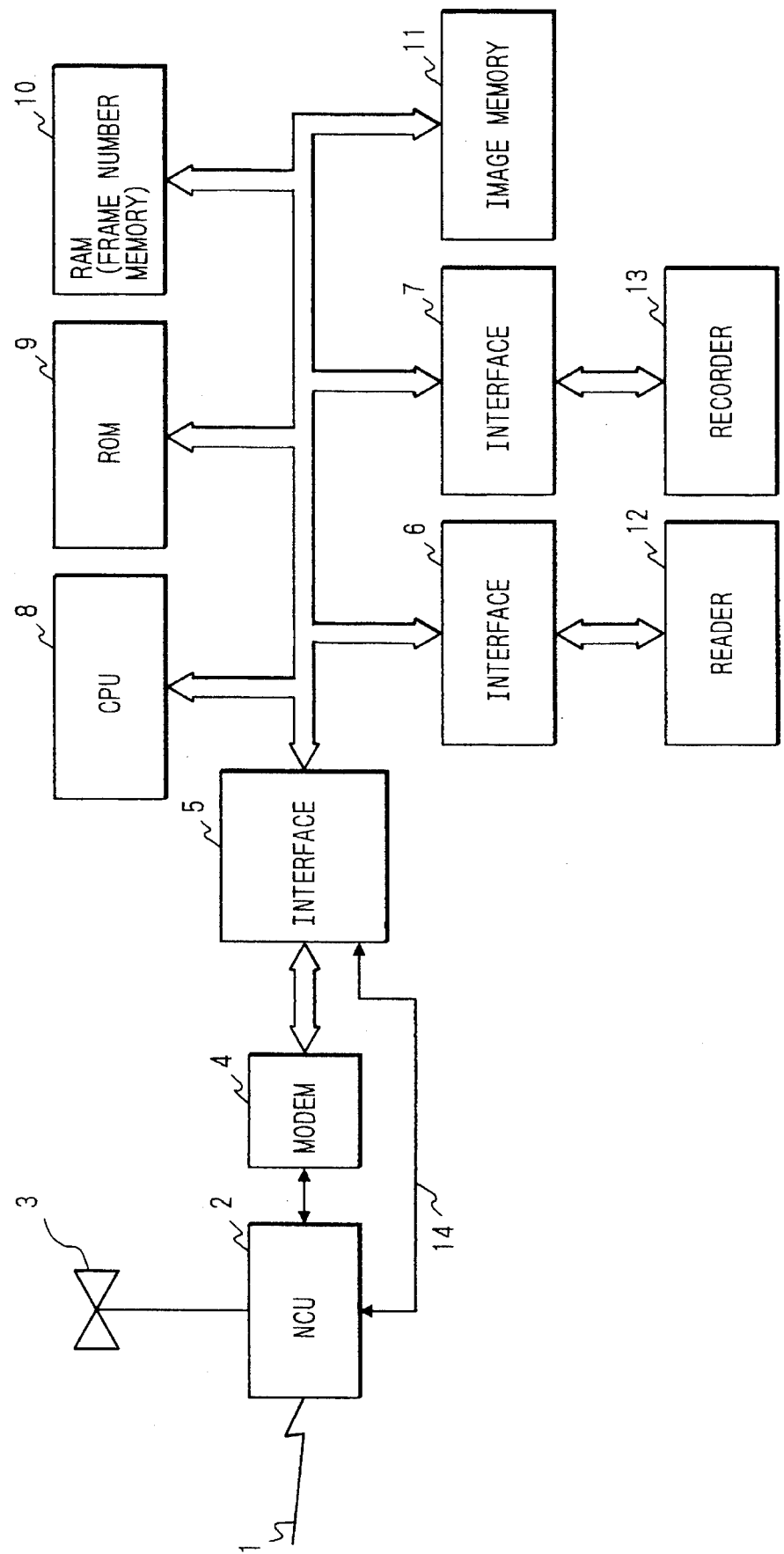
FIG. 1 is a block diagram showing the basic configuration of a facsimile apparatus according to an embodiment of the present invention.

The present invention will hereafter be described in detail with respect to embodiments thereof shown in the drawings.

Although a facsimile apparatus, which communicates image data in ECM, will be described as an example in the following embodiments, the present invention is not limited to ECM, nor to a facsimile apparatus. That is, the present invention can be applied to all data communication apparatus (such as telex, computer communication and word processor communication) which perform an error correcting communication.

FIG. 1 is a block diagram showing an outline configuration of a facsimile apparatus having an ECM function according to an embodiment of the present invention.

In FIG. 1, numeral 1 is a communication line, and 3 is a telephone set.

A network control unit (NCU) 2 switches a communication line 1 to a telephone set 3 or MODEM 4 for connection.

The MODEM 4 modulates and demodulates a picture signal and a control signal in a FAX protocol, and has a modulation and demodulation function such as V21, V27ter and V29 as recommended by CCITT.

An interface 5 inputs and outputs a signal between the MODEM 4 and a CPU 8.

Interfaces 6 inputs and outputs a signal between a reader 12 and the CPU 8, and interface 7 inputs and outputs a signal between a recorder and the CPU.

The CPU 8 controls this facsimile apparatus as a whole, and consists of microcomputers. The CPU 8 controls the apparatus by executing a control program stored in a ROM (read only memory) 9. The CPU 8 also encodes and decodes an image data.

A RAM (random access memory) 10 temporarily stores various information, and is provided with an error frame in ECM, or a frame number storage area for storing a frame number in which an overflow in a memory OCCURS.

An image memory 11 stores image data, and is used for memory sending, memory reception and ECM.

A reader 12 reads an original (or a draft).

A recorder (or printer) 13 records image data.

The configuration of a facsimile apparatus has been described above, and the outlined sending and receiving operations of a facsimile apparatus according to an embodiment of the present invention will be described.

In the case of sending, when the memory send mode is specified by a key input switch (not shown) provided at the reader 12, an original is read by the reader 12, and the read image information is encoded to be stored in the image memory 11. When a line is connected with a specified recipient by dialing (sending) the recipient by a dial key provided at the reader 12 after all the originals have been read, the FAX protocol is executed, and the communication mode is set by sending and receiving a control signal with the recipient.

In this FAX protocol, when the recipient has an ECM (error correction mode) function, is communicated an image in ECM. When the recipient has no ECM function, an image is communicated in an ordinary way. When a real-time send mode has been specified, the recipient is dialed and the FAX protocol is executed to set a communication mode, and then the original image is read so that it can be sent.

In the case of receiving, when there is no recording paper in the recorder 13, or when the private mode has been specified by the recipient, memory reception is performed to store a received image in the image memory 11. Also when there is recording paper and no private mode has been specified, the reception is recorded in an ordinary way.

In a facsimile apparatus according to an embodiment of the present invention, the image memory 11 is used fop memory sending and memory reception, and also as a buffer memory in ECM. In ECM recommended by CCITT, a buffer memory with a minimum of 64K bytes is required to store one block (one partial page) of image information. However, to efficiently utilize the image memory 11 fop memory sending and memory reception according to an embodiment of the present invention, a minimum of 16K bytes for ECM in the image memory 11 must be secured, and an image in ECM can be communicated (the second error correcting communication mode) by means of the image memory for 16K bytes.

Also when there is an unused capacity of 64K bytes or more depending upon the condition of use of the image memory, the image (the first error correcting communication mode) can be communicated in ECM using an ordinary memory of 64K bytes.

Figure 2B:
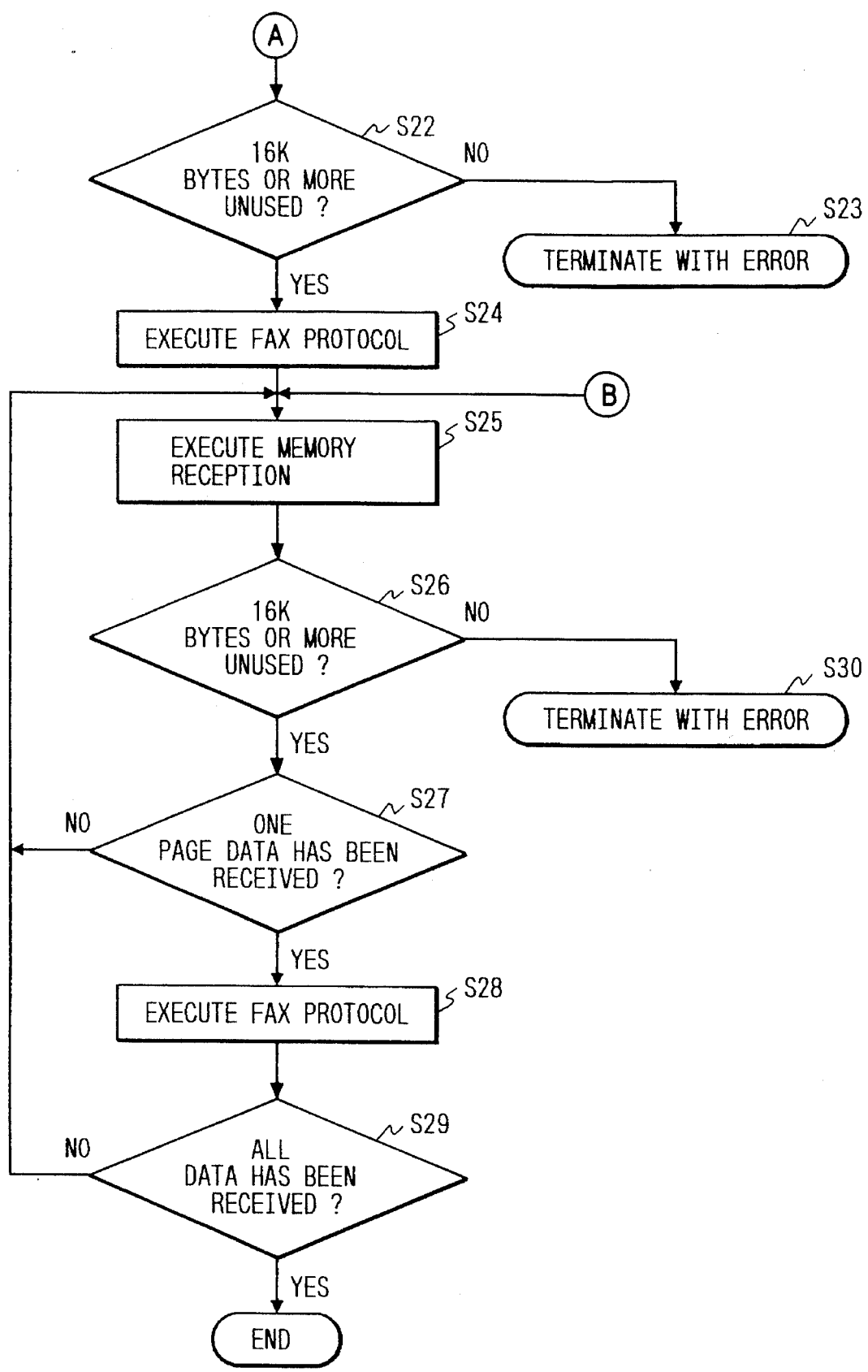
FIGS. 2(A–C), 3 and 4(A–C) are flow charts showing a control operation of a CPU 8 according to an embodiment of the present invention.
Figure 2C:
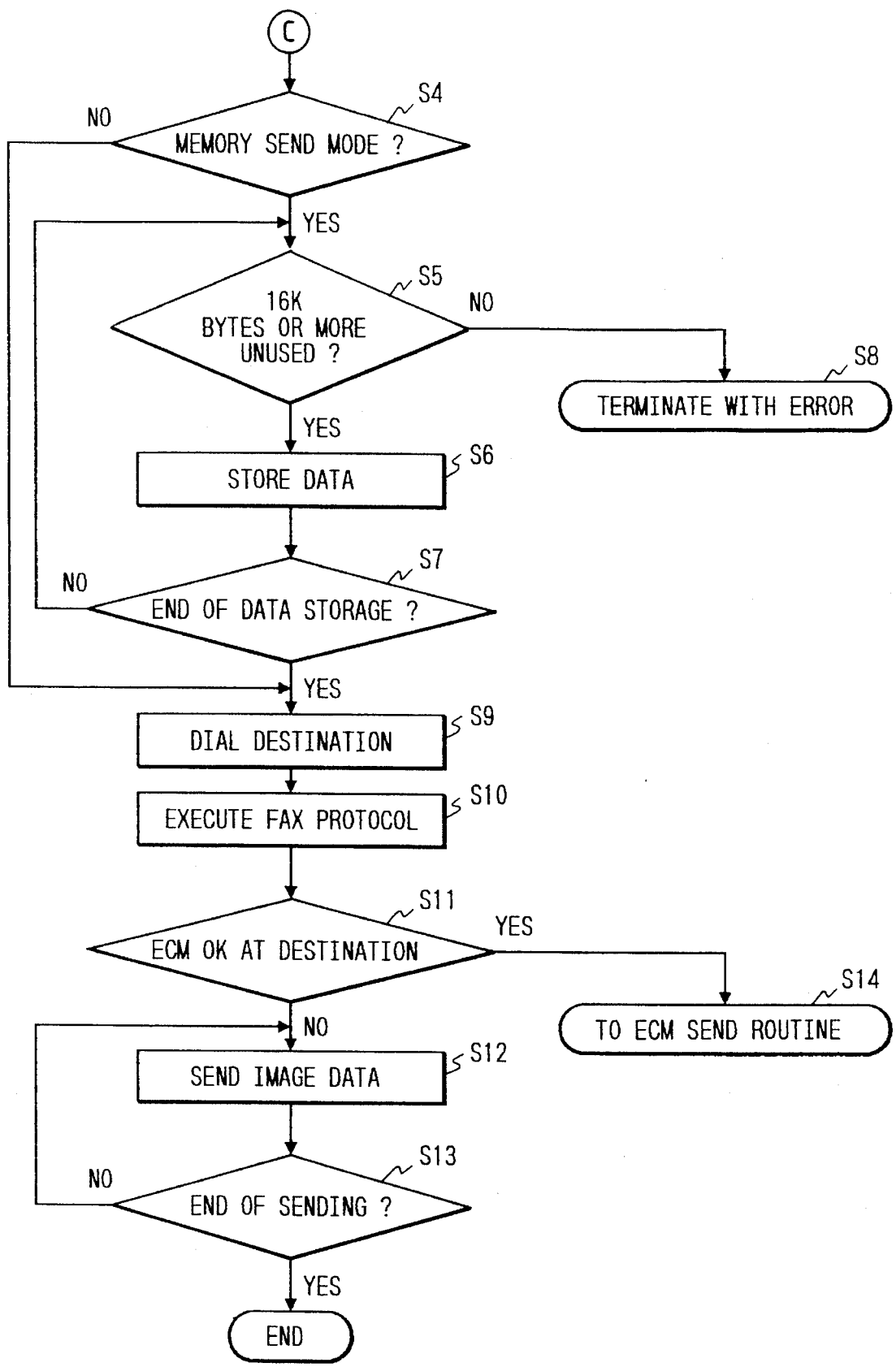
Figure 4B:
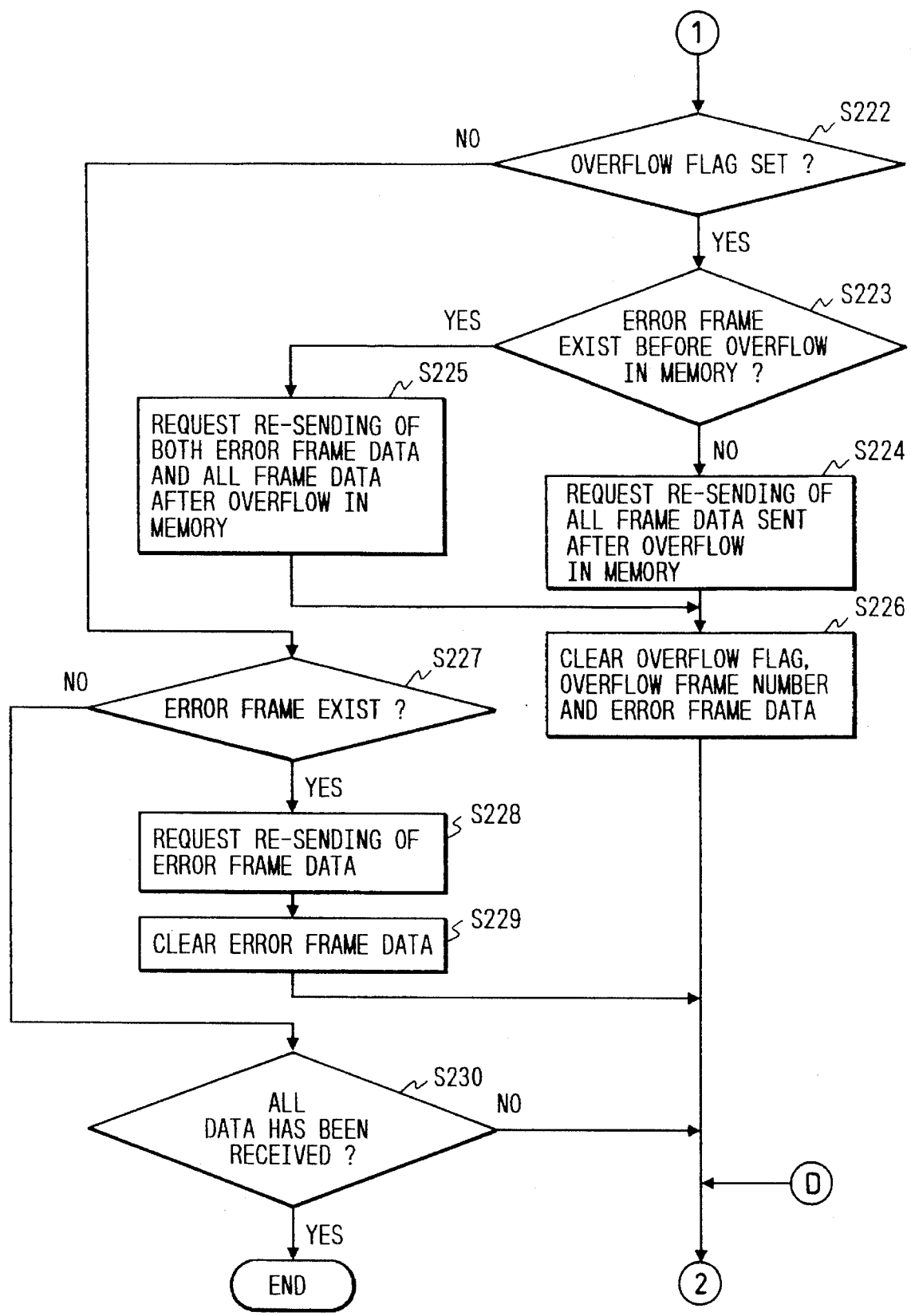
Figure 4C:
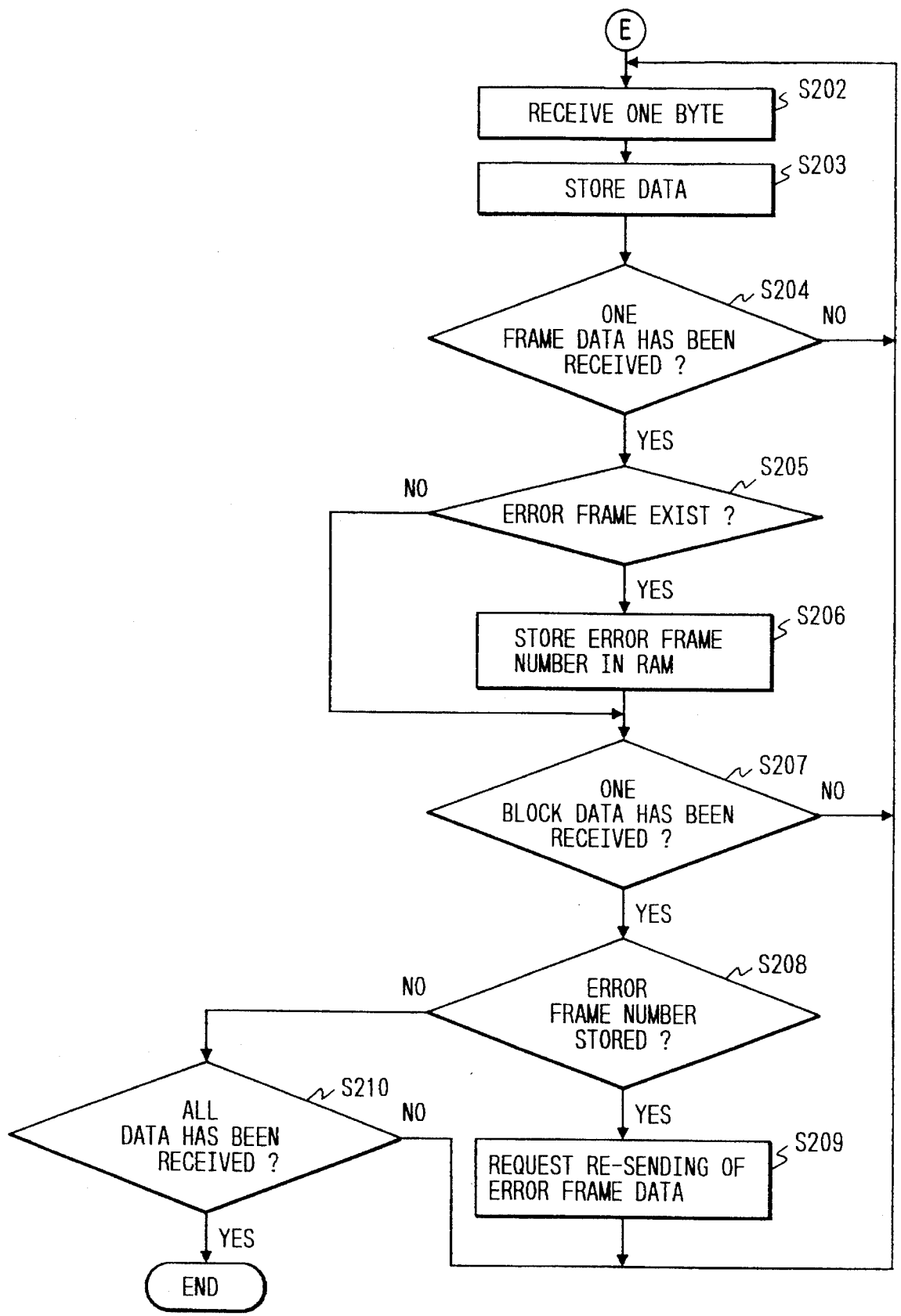

FIGS. 2 to 4 are flow charts showing a control operation of the CPU 8 according to an embodiment of the present invention. A control program to execute these flow charts has been stored in the ROM 9. The operation of this embodiment will be described in detail following the flow.

First it is detected in step S1 in FIG. 2 whether or not sending is instructed by the key input switch in the reader 12, and it is detected in step 2 whether or not there is a call signal from the line 1 (presence of incoming). If there is an instruction for sending, a process proceeds from step S1 to step S4, and it is judged whether or not the memory send mode is selected. When the memory send mode is selected, the original image is read by the reader 12, and the read image is encoded and stored in the image memory 11 in order in steps S5, S6 and S7. Thus, it is detected in step S5 whether or not the unused capacity of the image memory 11 is 16K bytes or more, when the unused capacity of the image memory 11 is 16K bytes, the process terminates as storage error due to memory full in step S8. The image data is thus stored in the memory 11, and after it is detected in step S7 that all the original images have been stored, the process proceeds to step S9.

On the other hand, when the memory send mode is not selected in step S4, the process proceeds from step S4 to step S9. In step S9 using a dial key (such as ten-key pad and one-touch dial key) of the reader 12 it is executed to dial a designated recipient (destination station). An auto-dialer is provided at a NCU 2, and the CPU 8 sends dial data to the auto-dialer at the NCU 2 for dialing. When the line 1 is connected with the recipient, the FAX protocol is executed in step S10. When it is judged by this protocol in step S11 that the recipient was an apparatus equipped with ECM function, the process proceeds to a ECM send routine of step S14. Also if the recipient has no ECM function in step S11, image data is sent in step S12. In the case of memory sending, the image data is sent from the image memory 11, and in the case of real-time sending, the image data read in the reader 12 is encoded in order for sending. When all image data have been thus sent, the sending operation is terminated.

When a call signal (call signal of 16 Hz or 1300 Hz) is given from the line 1 in step S2 the process proceeds to step S15 to check the recorder 13 for recording paper. If the recorder 13 has no recording paper, it is judged in step S22 whether or not the unused capacity of the image memory is 16K bytes or more, and if the unused capacity of the memory 11 is more than 16K bytes, the FAX protocol is executed in step S24. If the unused capacity of the memory 11 is 16K bytes, the process terminates with the error due to no recording paper in step S23.

If there is any recording paper in the recorder 13, the process proceeds from step S15 to step S16 to execute the FAX protocol. In step S17, it is judged whether or not a private mode is specified in the FAX protocol, and in step 18 it is judged whether or not ECM is specified. When the private mode is specified, the process proceeds from step S17 to step S25 to execute memory reception in the private mode. Also if ECM is specified, ECM receive routine is executed in step S19. If neither the private mode nor ECM is specified, the process proceeds from step S18 to step S20 to record the received image data in order (real-time receive record), and when all image data have been received, the control operation is terminated. If the recording paper is out in the recorder 13 while receiving image data for recording in steps S20 and S21, the process proceeds to step S26 to shift to memory reception, When there is no recording paper, the process proceeds to steps S15, S22 and S24 as mentioned above, and memory reception is performed in step S25. On the other hand, in the case of the private mode, the process proceeds from step S17 to step S25 for memory reception. It is judged in step S26 whether or not the unused capacity of the image memory 11 is more than 16K bytes, and if the unused capacity in the memory 11 is 16K bytes, the process terminates with an error in step S30. Also if the unused capacity of the memory 11 is more than 16K bytes, it is judged in step S27 whether or not an image for one page has been received. After the image for one page has been received, the FAX protocol is executed in step S28, and it is judged in step S29 whether or not all images have been received, and the process terminates the reception operation when it is judged that all images have been received.

In the flow chart in FIG. 2 as mentioned above, the unused capacity of the image memory 11 will be used for memory reception or memory sending before it becomes 16K bytes.

The ECM receiving operation according to an embodiment of the present invention will be described.

FIGS. 3 and 4 are flow charts showing a process to be executed by the CPU 8 on receiving ECM. When proceeding to step S19 in the flow chart in FIG. 2, the ECM record routine in FIG. 3 is first started, and the ECM interrupt routine in FIG. 4 is executed in the ECM record routine in FIG. 3 by interrupt request (MODEM interrupt) from the MODEM 4. Accordingly, the ECM reception is performed in accordance with the ECM record routine in FIG. 3 and the ECM interrupt routine in FIG. 4.

First, after reading information on an area for storing a complete frame number (frame number free from errors) of RAM 10 in step S100 in FIG. 3, it is judged whether or not a frame to be recorded exists (whether or not data for the corresponding frame is complete). If there is a frame to be recorded, data for the frame from the image memory 11 is read in step S101 to increase the frame number. Thereafter, the processes in steps S102 to S107 are executed, and then it is judged in step S100 again whether data for the frame of the increased number is complete.

After reading data of one frame from the image memory 11 in step S101, the frame data read in step S102 is processed byte by byte for decoding. It is judged in step S103 whether or not the decoded data (raw data) for one line is complete, and if the raw data for one line is not complete, it is judged in step S108 whether or not data to be decoded still remains. If the data to be decoded still remains, the process returns to step S102 for continuously decoding. On the other hand, if no data to be decoded exists, the process returns to step S100 and waits until the next frame data is complete.

After raw data for one line is complete by the above process, it is judged in step S104 whether or not the recorder 13 is busy. If the recorder 13 is not busy, the raw data for one line is transferred to the recorder 13 in step S105. Thus, the data for one line is recorded. It is judged in step S106 whether or not an image data for one page has been recorded, and if one page data has not been recorded, the process proceeds to step S108. If one page data has been recorded, it is judged in step S107 whether or not there is the next page (all pages of data have been recorded), and if there is the next page, the process returns to step S100.

The ECM interrupt routine in FIG. 4 is executed by a MODEM interruption from the MODEM 4 while the ECM record routine in FIG. 3 is being executed. Since, when a received image data for one byte is complete, the MODEM 4 transfers a data for one byte to CPU 8, a MODEM interruption occurs. A step to be executed by one MODEM interruption is up to returning to step S211, or until the routine is completed. Assuming, for example, that the execution starts with step S211, the step is a period up to returning to step S211 again.

First a detection is made in step S201 as to whether or not the unused capacity of the image memory 11 is 64K bytes or more, and if 64K bytes or more exist, the received image data in an ordinary ECM in step S202 and after is recorded. On receipt of one byte data from the MODEM 4 in step S202, it is stored in a buffer area (for 64K bytes) for ECM in the image memory 11 in step S203. When it is judged in step S204 that one frame data has been received, the presence of frame error is checked in step S205. If a frame error exists, information with an error frame number is stored in an error frame number area of RAM 10 in step S206, and it is judged in step S207 whether or not one block data has been received.

On receipt of one block data, it is judged in step S208 whether or not an error frame number is written (whether any error frame exists or not) in the error frame number area in RAM 10. If an error frame exists the process proceeds to step S209. In the step S209, the frame number data for re-sending request are arranged to request a transmitter to re-send the error frames in accordance with the re-sending request procedure (not shown) after passing through this interrupt routine. Thus, the error frame data is received again.

Similarly also in steps S224, S225 and S228, the frame number data for re-sending request are arranged to request the re-sending after passing through the interrupt routine. If one block of data is thus free from errors, it is judged in step S210 whether or not all data have been received. If all data have been received, the receiving operation is terminated.

If the unused capacity of the image memory 11 is less than 64K bytes in step S201, one byte data is received from the MODEM 4 in step S211, and it is judged in step S212 whether or not an overflow flag is set in the RAM 10. If no overflow flag is set, the data is stored in the buffer area for ECM in the image memory 11 in step S213. It is judged in step S214 whether or not the image memory 11 is full (no unused bytes). When the memory is full, an overflow flag is set in the RAM 10 in step S215, and information on the frame number at the time when an overflow occurs, is stored in the RAM 10 in step S216.

When one frame data has been thus received in step S217, it is checked in step S218 whether or not the received frame data is error frame data. If it is not error frame data, the complete frame number is stored in the RAM 10 in step S219 as described in step S100 in FIG. 3. On the other hand, if it is error frame data, the error frame number is stored in the RAM 9 in step S220. It is judged in step S221 whether or not one block data has been received, and if one block data has not been received, the process returns to step S211. If one block data has been received, the process proceeds to step S222.

It is judged in step S222 whether or not an overflow flag is set to the RAM 10. When an overflow flag is set, it is judged in step S223 whether or not an error frame existed before an overflow (memory full) in the image memory 11. This is performed by judging whether or not information on error frame number is written in the RAM 10 before the frame number stored in step S216. When there was no error frame before the overflow, the frame number data are arranged in step S224 to request re-sending of all frame data after the overflow in memory, and the process proceeds to step S226. On the other hand, when there was an error frame before the overflow, the frame number data are arranged in step S225 to request re-sending of both error frame data and all frame data after the overflow in memory, and the process proceeds to step S226.

In step S226, both the overflow flag of the RAM 10 and the frame number information after the overflow are cleared, and also the error frame data of the image memory 11 is cleared, and then the process returns to step S211. In step S225, re-sending of both error frame data and all frame data after the overflow in memory is requested, but re-sending of all frame data after the error frame may be requested to simplify the control of the CPU 8.

If an overflow flag is not set in step S222, it is judged in step S227 whether or not there is an error frame. If there is an error frame, the frame number data are arranged to request re-sending of the error frame data in step S228, and the error frame data in the image memory 11 is cleared in step S229, and then the process returns to step S211. If there is no error frame in step S227, is judged in step S230 whether or not all data is received. If all data has not been received, the process returns to step S211, and if all data has been received, the receiving operation is terminated.

Recording the received data in accordance with the above ECM record routine is performed nonsynchronously with storing the received data into the image memory 11 in accordance with the ECM interrupt routine. The image memory data is read in order and is recorded by the recorder 13 until an error frame occurs. When an error frame occurs, the recording is stopped at a step S100 in FIG. 3, and when an error frame is normally received after re-sending, the recording will be executed again.

According to an embodiment of the present invention, a data can be received in ECM even if 64K bytes or less of the image memory 11 are unused (that is, a data can be received in ECM even for any capacity 64K bytes or less, a minimum capacity at which a data can be sent in ECM). In the above-mentioned embodiment, it is possible to receive in ECM even if 16K bytes to 64K bytes of the image memory 11 are unused.

Figure 5:
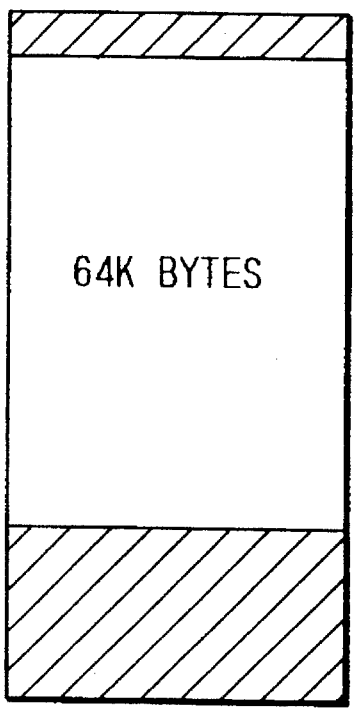
FIGS. 5 and 6 are views showing examples of an area for ECM of an image memory 11.
Figure 6:
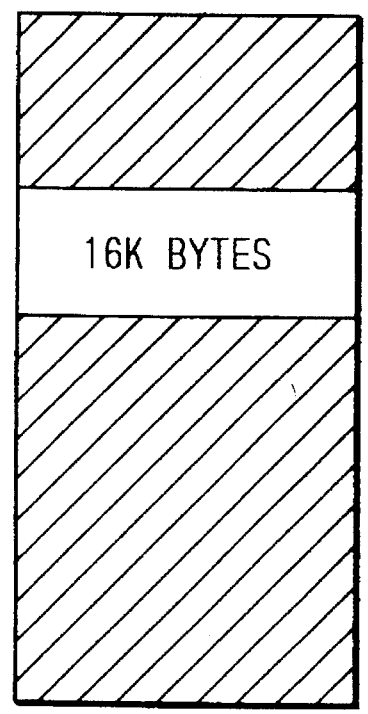

FIG. 5 shows that an area for ECM of the image memory 11 has 64K bytes, and the shaded area is used for memory sending and memory reception. In this case, ordinary reception in ECM is performed. FIG. 6 shows that an area for ECM of the image memory 11 has 16K bytes, and in this case, reception in ECM is performed by using a method shown in the above-mentioned embodiment.

In the above embodiment, it is so constructed that a minimum of 16K bytes are secured as an area for ECM in the image memory 11. However, the entire image memory 11 is arranged to be used for memory sending and memory reception, and when 16K bytes of the image memory 11 are unused, it is possible to notify (notify by FAX protocol) the opposite apparatus of having an ECM function. The minimal capacity for ECM of the image memory 11 is not limited to 16K bytes.

Applications of the present invention are not limited to the above-mentioned embodiments, but can be modified in various ways.

We claim:

1. A data communication apparatus having an error correcting communication mode in half-duplex operation for communicating data, said apparatus comprising:

a memory for storing received data, said memory having a capacity for storing data of not more than an amount of data to be transmitted in said error correcting communication mode;

declaring means for declaring that the error correcting communication is executable if a capacity of said memory is not more than an amount of data to be transmitted in said error correcting communication mode; and means for detecting an overflow in said memory and presence of an error in the received data, and requesting that data be re-sent in accordance with the detection.

2. The data communication apparatus according to claim 1, wherein said memory is utilized for any memory communication other than said error correcting communication mode.

3. The data communication apparatus according to claim 1, wherein an unused capacity of said memory is detected and error correcting communication is performed in accordance with the detected unused capacity of said memory.

4. The data communication apparatus according to claim 1, further comprising means for recording received data, wherein storing received data in said memory is performed non-synchronously with recording data in said memory.

5. A data communication apparatus having an error correcting communication mode for communicating data, said apparatus comprising:

a memory for storing a data;

declaring means for declaring that the error correcting communication is executable even if a capacity of said memory is not more than an amount of data to be transmitted in said error correcting communication mode; and control means for judging an unused capacity of said memory and for controlling a communication sequence of error correcting communication in accordance with a result of the judgment.

6. The data communication apparatus according to claim 5, wherein said apparatus has at least a first error correcting communication mode and a second error correcting communication mode, and said control means selects either said first error correcting communication mode or said second error correcting communication mode in accordance with the result of the judgement.

7. The data communication apparatus according to claim 6, wherein said control means selects said first error correcting communication mode when the unused capacity of said memory is at least a predetermined capacity.

8. The data communication apparatus according to claim 6, wherein the data is received in blocks and wherein said first error correcting communication mode is for detecting the presence of an error in the received data while one block of data is being received, and for requesting re-sending of data in accordance with the error detection result and wherein said second error correcting communication mode is for detecting an overflow in said memory and the presence of an error in the received data while one block of data is being received and for requesting re-sending of data in accordance with the overflow and error detection results.

9. A data communication apparatus having an error correcting communication mode in half-duplex operation for communicating data, comprising:

a memory for storing data used for communicating data using said error correcting communication mode;

declaring means for declaring that the error correcting communication is executable eyed if a capacity of said memory is not more than an amount of data to be transmitted in said error correcting communication mode; and control means for judging an unused capacity of said memory using the error correcting communication mode, and for controlling a data communication sequence of the error correcting communication mode in accordance with a result of the judgment.

10. The data communication apparatus according to claim 9, wherein said apparatus has at least a first error correcting communication mode and a second error correcting communication mode, and said control means selects either said first error correcting communication mode or said second error correcting communication mode in accordance with the result of the judgment.

11. The data communication apparatus according to claim 10, wherein said control means selects said first error correcting communication mode when the unused capacity of said memory is at least a predetermined capacity.

12. The data communication apparatus according to claim 10, wherein said first error correcting communication mode is for detecting the presence of an error in the received data while one block data is being received, and for requesting re-sending of data in accordance with the error detection result and wherein said second error correcting communication mode is for detecting an overflow in said memory and the presence of an error in the received data while one block data is being received and requests resending of data in accordance with the overflow and error detection results.

13. The data communication apparatus according to claim 12, wherein the data is received in blocks and wherein, when in said second error correcting communication mode, an overflow in said memory is detected while one block of data is being received, said control means requests all of the data to be re-sent after the overflow is detected in the one block after the one block of data is received.

14. The data communication apparatus according to claim 13, wherein, when there is an error data in the received data until said overflow is detected, and the received data containing the error data is part of a block of data, said control means requests re-sending of both said error data and all data after the overflow detected in the block.

15. The data communication apparatus according to claim 9, wherein said memory is used for any data memory communication other than said error correcting mode.

16. An error data detecting communication method using half-duplex operation for communicating data, comprising the steps of:

declaring that the error correcting communication is executable even if a capacity of a memory used for error correcting communication is not more than an amount of data to be transmitted in an error correcting communication mode;

judging an unused capacity of a memory which stores data used for error correcting communication by error correcting communication is performed; and controlling a communication sequence of the error correcting communication in accordance with a result of the judgment.

17. An error data detecting communication method according to claim 16, wherein said apparatus has at least a first error correcting communication mode and a second error correcting communication mode, and said control means selects either said first error correcting communication mode or said second error correcting communication mode in accordance with the result of the judgment.

18. An error data detecting communication method using half-duplex operation according to claim 17, wherein said control means selects said first error correcting communication mode when the unused capacity of said memory is more than a specified capacity.

19. An error data detecting communication method according to claim 15, wherein said first error correcting communication mode is for detecting the presence of an error in the received data while one block data is being received and for requesting resending of data in accordance with the error detection result and wherein said second error correcting communication mode is for detecting an overflow in said memory and the presence of an error in the received data while one block data is being received, and for requesting re-sending of data in accordance with the overflow and error detection results.

20. A data communication apparatus for performing error data correcting communication for a predetermined amount of data block by block, comprising:

a memory for storing data to be used during error correcting communication;

declaring means for declaring that the error correcting communication is executable even if a capacity of said memory is not more than an amount of data to be transmitted in said error correcting communication mode; and control means for judging whether or not an unused capacity of said memory is not less than the amount of one block of said data using the error correcting communication, and controlling a communication sequence of the error correcting communication in accordance with the result of the judgment.

21. A data communication apparatus according to claim 20, wherein said apparatus has at least a first error correcting communication mode and a second error correcting communication mode, and said control mean selects either said first error correcting communication mode or said second error correcting communication mode in accordance with the result of the judgment of the unused capacity of said memory.

22. A data communication apparatus according to claim 21, wherein said first error correcting communication mode is for detecting the presence of an error in the received data while one block data is being received and for requesting re-sending of the data in accordance with the error detection result and wherein said second error correcting communication mode is for detecting an overflow in said memory and the presence of an error in the received data while one block data is being received, and for requesting re-sending of data in accordance with the overflow and error detection results.

23. A data communication apparatus according to claim 22, wherein the data is received in blocks and wherein, when in said second error correcting communication mode, an overflow in said memory is detected while one block of data is being received, and said control means requests all of the data to be re-sent after the overflow is detected in the one block after the one block of data is received.

24. A data communication apparatus according to claim 23, wherein, when there is an error data in the received data until said overflow is detected, and the received data containing the error data is part of a block of data, said control means requests re-sending of both said error data and all data after the overflow detected in the block.

25. A data communication method having an error correcting communication mode in half-duplex operation for communicating data, said method comprising the steps of:

storing received data in a memory, the memory having a capacity of restoring data of not more than an amount of data to be transmitted in the error correcting communication mode;

declaring that the error correcting communication is executable if a capacity of said memory is not more than an amount of data to be transmitted in said error correcting communication mode; and detecting an overflow in the memory and presence of an error in the received data, and requesting that data be re-sent in accordance with the detection.

26. The data communication method according to claim 25, wherein the memory is utilized for any memory communication other than the error correcting communication mode.

27. The data communication method according to claim 25, wherein an unused capacity of the memory is detected and error correcting communication is performed in accordance with the detected unused capacity of the memory.

28. The data communication method according to claim 25, further comprising a step for recording received data, wherein storing received data in the memory is performed non-synchronously with recording data in the memory.

29. A data communication method having an error correcting communication mode for communicating data, said method comprising the steps of;

storing data in a memory;

declaring that the error correcting communication is executable even if a capacity of said memory is not more than an amount of data to be transmitted in said error correcting communication mode; and judging an unused capacity of the memory and controlling a communication sequence of error correcting communication in accordance with a result of the judgment.

30. The data communication method according to claim 29, wherein said method has at least a first error correcting communication mode and a second error correcting communication mode, and said judging step selects either the first error correcting communication mode or the second error correcting communication mode in accordance with the result of the judgment.

31. The data communication method according to claim 30, wherein said judging step selects the first error correcting communication mode when the unused capacity of the memory is at least a predetermined capacity.

32. The data communication method according to claim 30, wherein the first error correcting communication mode is for detecting the presence of an error in the received data while one block data is being received, and for requesting re-sending of data in accordance with the error detection result and wherein the second error correcting communication mode is for detecting an overflow in the memory and the presence of an error in the received data while one block data is being received and for requesting re-sending of data in accordance with the overflow and error detection results.

33. A data communication method for performing error data correcting communication for a predetermined amount of data block by block, comprising the steps of;

storing data in a memory to be used during error correcting communication;

declaring that the error correcting communication is executable even if a capacity of said memory is not more than an amount of data to be transmitted in said error correcting communication mode; and control means for judging whether or not an unused capacity of said memory is not less than the amount of said one block data using the error correcting communication, and controlling a communication sequence of the error correcting communication in accordance with the result of the judgement.

34. A data communication method according to claim 33, wherein said method has at least a first error correcting communication mode and a second error correcting communication mode, and said judging step selects either the first error correcting communication mode or the second error correcting communication mode in accordance with the result of the judgment of the unused capacity of the memory.

35. A data communication method according to claim 34, wherein the first error correcting communication mode is for detecting the presence of an error in the received data while one block data is being received and for requesting re-sending of the data in accordance with the error detection result and wherein the second error correcting communication mode is for detecting an overflow in the memory and the presence of an error in the received data while one block data is being received, and for requesting re-sending of data in accordance with the overflow and error detection results.

36. A data communication method according to claim 35, wherein, when in the second error correcting communication mode, data is received in blocks and an overflow in the memory is detected while one block of data is being received, and said judging step requests all of the data to be re-sent after the overflow is detected in the one block after the one block of data is received.

37. A data communication apparatus according to claim 36, wherein, when there is an error data in the received data until the overflow is detected, the control means requests re-sending of both the error data and all data after the overflow detected in the one block.

* * * * *

UNITED STATES PATENT AND TRADEMARK OFFICE
CERTIFICATE OF CORRECTION

PATENT NO. : 5,526,367

DATED : June 11, 1996

INVENTOR(S) : TAKASHI ONO ET AL.    Page 1 of 2

It is certified that error appears in the above-identified patent and that said Letters Patent is hereby corrected as shown below:

Title page,

AT [57] REFERENCES CITED

Foreign Patent Documents,
    "1176162  7/1989  Japan" should read
    --1-176162  7/1989  Japan--.

Title page, under Other Publications,
    Attorney, Agent or Firm,
    "Fitzpatrick Cella Harper & Scinto" should read
    --Fitzpatrick, Cella, Harper & Scinto--.

COLUMN 2

Line 36, "Interfaces" should read --Interface--.
    Line 48, "OCCURS." should read --occurs.--.

COLUMN 3

Line 2, "is communicated an image" should read
        --an image is communicated--.
    Line 15, "fop" should read --for--.
    Line 20, "fop" should read --for--.

COLUMN 8

Line 28, "eyed" should read --even--.
    Line 57, "resending" should read --re-sending--.

COLUMN 9

Line 35, "claim 15," should read --claim 17,--.
    Line 38, "resending" should read --re-sending--.

UNITED STATES PATENT AND TRADEMARK OFFICE
CERTIFICATE OF CORRECTION

PATENT NO. : 5,526,367
DATED : June 11, 1996
INVENTOR(S) : TAKASHI ONO ET AL.

Page 2 of 2

It is certified that error appears in the above-identified patent and that said Letters Patent is hereby corrected as shown below:

COLUMN 10

Line 56, "of;" should read --of:--.

COLUMN 11

Line 22, "of;" should read --of:--.

Signed and Sealed this

Twenty-sixth Day of November 1996

Attest:

BRUCE LEHMAN

Attesting Officer

Commissioner of Patents and Trademarks